US007945382B2

(12) United States Patent
Umemura et al.

(10) Patent No.: US 7,945,382 B2
(45) Date of Patent: May 17, 2011

(54) NAVIGATION APPARATUS AND METHOD

(75) Inventors: Tomoya Umemura, Okazaki (JP); Kensuke Takeuchi, Okazaki (JP)

(73) Assignee: Aisin AW Co., Ltd. (JP)

( * ) Notice: Subject to any disclaimer, the term of this patent is extended or adjusted under 35 U.S.C. 154(b) by 534 days.

(21) Appl. No.: 12/076,028

(22) Filed: Mar. 13, 2008

(65) Prior Publication Data

US 2008/0244180 A1  Oct. 2, 2008

(30) Foreign Application Priority Data

Mar. 30, 2007 (JP) .................................. 2007-094367

(51) Int. Cl.
*G01C 21/00* (2006.01)

(52) U.S. Cl. ....................................... 701/200; 701/208

(58) Field of Classification Search ........................ None
See application file for complete search history.

(56) References Cited

U.S. PATENT DOCUMENTS

| | | | | |
|---|---|---|---|---|
| 6,075,467 A * | 6/2000 | Ninagawa | ................. | 340/995.14 |
| 7,542,847 B2 | 6/2009 | Okumura | ....................... | 701/211 |
| 7,613,917 B1 * | 11/2009 | Chojnacki | ..................... | 713/150 |
| 2001/0003169 A1 * | 6/2001 | Kaneko et al. | ................. | 701/208 |
| 2002/0156739 A1 * | 10/2002 | Hirai et al. | ...................... | 705/52 |
| 2003/0220735 A1 * | 11/2003 | Nimura | ........................... | 701/208 |
| 2006/0173614 A1 * | 8/2006 | Nomura | ........................ | 701/210 |

FOREIGN PATENT DOCUMENTS

| | | |
|---|---|---|
| JP | 11-325948 | 11/1999 |
| JP | 2002-062142 | 2/2002 |
| JP | 2002-175594 | 6/2002 |
| JP | 2002-357428 | 12/2002 |
| JP | 2005-331579 | * 12/2005 |
| JP | 2007-47212 | * 2/2007 |

* cited by examiner

*Primary Examiner* — Michael J. Zanelli
(74) *Attorney, Agent, or Firm* — Bacon & Thomas, PLLC

(57) ABSTRACT

A navigation apparatus and method increase the upper limit for the number of times map data may be written into a portable storage medium. A CPU reads an initial radius and an additional radius increment from a ROM and repeatedly adds the additional radius increment to the initial radius to obtain, with each addition, a new calculated radius centered on coordinates of a central geographic point of a map data extracting-region. The map data for each secondary grid unit within the map data extracting-region is sequentially read out from a CD-ROM. Then, when the map data within the incrementally enlarged map data extracting-region exceeds the maximum storage capacity of the SD memory card, the CPU deducts the last added increment of radius from the calculated radius to obtain a map region to be stored. The CPU sequentially reads out from the CD-ROM the map data for each grid unit within the map region to be stored and sequentially writes the grid units of map data into the SD memory card.

14 Claims, 5 Drawing Sheets

NAVIGATION APPARATUS AND METHOD

INCORPORATION BY REFERENCE

The disclosure of Japanese Patent Application No. 2007-094367 filed on Mar. 30, 2007, including the specification, drawings and abstract thereof, is incorporated herein by reference in its entirety.

BACKGROUND

1. Related Technical Fields

Related technical fields include navigation apparatus and methods, and more particularly, navigation apparatus and methods that write information into a portable storage medium and read information from the portable storage medium.

2. Related Art

Navigation apparatus that is capable of writing information into a portable storage medium and reading information from the portable storage medium is known. For example, a navigation apparatus may use a rewritable portable storage medium such as a PC card and have a memory driver for writing a item, generated in execution or a program in an operating system, into the portable storage medium and for reading it out from the portable storage medium for use in execution of the program. For example, Japanese Unexamined Patent Application Publication No. ("Kokai") 11-325948 (cols. 0010-0024, FIGS. 1-4) discloses such a navigation apparatus.

The apparatus disclosed in Kokai 11-325948 reads out map data from a storage medium such as a CD-ROM. Data necessary for executing navigation functions for a route search and/or route guidance may be written into and read out from the portable storage medium. Consequently, if a user writes into the portable external storage medium the necessary input and/or instruction, the user may receive the navigation functions according to the input simply by inserting the portable external storage medium into a memory driver.

SUMMARY

However, in use of the navigation apparatus described in Japanese Kokai No. 11-325948, the storage medium such as a CD-ROM with the stored map data must be removed to listen to music or watch a movie on a CD or a DVD. However, if the storage medium such as the CD-ROM is removed during a driving maneuver, the navigation apparatus cannot execute the usual navigational (guidance) functions.

To address the above problem, map data in a predetermined range (a range of 500 km in radius, for example) centered on the current location of the driver's vehicle might be read out from a storage medium such as a CD-ROM storing map data and written into a portable storage medium having a flash memory, and map data necessary for a route search and/or route guidance could then be read out from the portable storage medium.

However, when map data is written into a portable storage medium having a flash memory, the map data needs to be written into a data file wherein the map data is divided into grid units of a predetermined size (a range of approx. 10 km×10 km, for example). For example, when map data with a range of approximate 1,000 km×1,000 km is written into the portable storage medium, the map data has to be written into about 10,000 grid units in succession, each grid unit having a range of approximately 10 km×10 km. On the other hand, the upper limit for the number of times the portable storage medium having the flash memory can receive successive writing might be about a hundred thousand to a million times. Therefore, the upper limit for the number of times map data for the predetermined range can be written into the portable storage medium might be approximately 100 to 200 times.

Further, map data for one given area is organized into a predetermined number of data files (100 data files, for example). Thus, when map data for a predetermined range centered on a specified geographic point is written into the portable storage medium, if the map data exceeds the maximum storage capacity, the map data for an entire outer portion of the range will be deleted, requiring that data be written into the portable storage medium again. Accordingly, the upper limit for the number of times the map data can be written into the portable storage medium having a flash memory may actually be as low as approximately twenty to a hundred times. Further, another problem may be that the copyright of the map data written into the portable storage medium needs to be protected.

Accordingly, the present invention provides a navigation apparatus and method for increasing the upper limit for the number of times map data can be written into the portable storage medium having a flash memory, and at the same time, protecting the copyright of the map data.

Accordingly, the present invention provides a navigation apparatus comprising map data storage means for storing map data, read-write means for writing the map data into a portable storage medium and for reading out the map data from the portable storage medium, capacity detection means for detecting a maximum storage capacity of the portable storage medium, central coordinates inputting means for inputting coordinates of a central geographic point of the map data to be written into the portable storage medium, sectional region setting means for setting a central sectional region of a predetermined range including the central geographic point and an outer sectional region, surrounding the central sectional region and also of a predetermined range, extracting-region creating means for creating a map data extracting-region by sequentially adding an outer sectional region of the predetermined range to the central sectional region, capacity judgment means for sequentially extracting map data of each map data extracting-region created by the extracting-region creating means from the map data storage means and, with each addition of an outer sectional region, sequentially judging whether or not the map data of the map data extracting-region is equal to or less than the maximum storage capacity, storage region determination means for determining the largest map data extracting-region which does not exceed the maximum storage capacity as a map region to be stored when the map data of the map data extracting-region has exceeded the maximum storage capacity, and reading-writing control means for extracting the map data of the map region to be stored from the map data storage means and for controlling the read-write means to write into the portable storage medium the map data of the thus determined map region to be stored.

The navigation method of the present invention includes inputting the coordinates of the central geographic point of the map data to be written into the portable storage medium, then expanding a central sectional region of a predetermined range including the input central geographic point by adding an outer sectional region of a predetermined distance dimension surrounding the central sectional region and sequentially adding additional outer sectional regions to create a map data extracting-region. In addition, the map data of each map data extracting-region that has been created is sequentially extracted from the map data storage means and for each sequential addition of map data for an extracting-region, a judgment is made as to whether or not the new total volume of map data is equal to or less than the maximum storage capacity of the portable storage medium. When the total volume of map data of the map data extracting-region has exceeded the maximum storage capacity of the portable storage medium, the largest map data extracting-region which does not exceed the maximum storage capacity is set as the map region to be stored. Subsequently, the map data of the map region set to be stored is extracted from the map data storage means and written into the portable storage medium through the read-write means.

Thus, the navigation method of the present invention includes: storing map data in a map storage unit of a computer; detecting maximum storage capacity of a portable storage medium; inputting into the computer coordinates of a central geographic point of the map data to be written into the portable storage medium; setting a central sectional region with a predetermined range including the central geographic point and sequentially adding outer sectional regions surrounding the central sectional region and each having a range of a predetermined distance greater than the range of the central sectional region, thus creating a new map data extracting-region with each addition of an outer sectional region; sequentially extracting map data for each created map data extracting-region from the map data storage unit and, for each extraction of map data, judging whether or not the total amount of extracted map data is equal to or less than the maximum storage capacity; determining the largest map data extracting region which does not exceed the maximum storage capacity, as a map region to be stored, when the map data extracting-region has exceeded the maximum storage capacity; and extracting the map data of the map region to be stored from the map data storage means and writing, into the portable storage medium, the map data extracted for the map region to be stored.

The navigation method may further include: storing navigation identification information which identifies the navigation apparatus; storing the coordinates of the central geographic point; and creating storage medium identification information including the navigation identification information and the coordinates of the central geographic point, wherein only the map data of the map region to be stored which is associated with the storage medium identification information is written into the portable storage medium.

Optionally, the navigation method may further include reading out the storage medium identification information from the portable storage medium and determining whether or not the storage medium identification matches the previously stored navigation identification information and coordinates of the central geographic point; and allowing map data to be read from the portable storage medium only when a match is determined.

Thus, merely by inputting the coordinates of the central geographic point of the map data through the central coordinates input means it becomes possible to extract the map data of the central sectional region centered on the central geographic point and the map data of the outer sectional region, as a total volume of data which does not exceed the maximum storage capacity of the portable storage medium having the flash memory, and to write it into the portable storage medium automatically. Thus, the present invention prevents deletion of map data for the entire outer region when writing map data into the portable storage medium and also increases the upper limit for the number of times the portable storage medium can be written into.

In a preferred embodiment, the navigation apparatus of the present invention may additionally include navigation identification information storage means for storing navigation identification information which identifies the navigation apparatus, central coordinates storage means for storing the coordinates of the central geographic point, and storage medium identification information creating means for creating storage medium identification information including the navigation identification information and the coordinates of the central geographic point. In such embodiments the read-write control means controls the read-write means to write into the portable storage medium the map data of the map region to be stored, in association with the storage medium identification information.

Thus, the navigation apparatus of the above preferred embodiment creates the storage medium identification information including the navigation identification information stored in the navigation identification information storage means and the coordinates of the central geographic point stored in the central coordinates storage means. Then, this storage medium identification information is written into the portable storage medium in association with the map data of the map region to be stored.

By storing the map data of the thus determined map region, in association with the navigation identification information and the coordinates of the central geographic point of the map region to be stored with the map data of this map region to be stored, the number of times the map data is written into the portable storage medium may be limited and the upper limit for the number of times the map data can be written into the portable storage medium may be increased. In addition, writing the navigation identification information and the coordinates of the central geographic point into the portable storage medium in association with the map data of the map region to be stored makes it possible to specify the particular navigation apparatus that wrote the map data into the portable storage medium and the coordinates of the central geographic point of this written map data.

The navigation apparatus may further include identification information judgment means for reading out the storage medium identification information from the portable storage medium and for judging whether or not the storage medium identification information matches the navigation identification information stored in the navigation identification information storage means and the coordinates of the central geographic point stored in the central coordinates storage means and reading-writing control means for controlling the read-write means to read the map data from the portable storage medium only when the storage medium identification information matches the navigation identification information stored in the navigation identification information storage means and the coordinates of the central geographic point stored in the central coordinates storage means.

When provided with the reading-writing control means, the navigation apparatus reads out the storage medium identification information from the portable storage medium, and if the storage medium identification information includes the navigation identification information stored in the navigation identification information storage means and the coordinates of the central geographic point stored in the central coordinates storage means, only then does the reading-writing control means allow the read-write means to read out the map data from the portable storage medium.

Thus, when the map data written into the portable storage medium is illegally duplicated and installed in read-write means of another navigation apparatus, the navigation identification information and the coordinates of the central geographic point associated with this illegally duplicated map data do not match the corresponding information stored in the navigation identification information storage means and in the central coordinates storage means of the other navigation apparatus. Therefore, the other navigation apparatus cannot read the map data stored in the portable storage medium. Accordingly, duplication of the map data written into the portable storage medium is controlled and the copyright of the map data written into the portable storage medium is protected.

The navigation apparatus may also include date obtaining means for obtaining the date on which the map data is written into the portable storage medium, and the central coordinates storage means stores the date corresponding to the coordinates of the central geographic point and the storage medium identification information includes the date.

When provided with date obtaining means the navigation apparatus obtains the date on which the map data is written into the portable storage medium and stores that date in the central coordinates storage means in association with the coordinates of the central geographic point. In addition, the navigation apparatus creates the storage medium identification information including the navigation identification information stored in the navigation identification information storage means, the coordinates of the central geographic point stored in the central coordinates storage means, and the date associated with the coordinates of the central geographic point. Then, the storage medium identification information is written into the portable storage medium in association with the map data of the map region to be stored.

Because the navigation identification information, the coordinates of the central geographic point of the map region to be stored, and the date, on which the map data has been written into the portable storage medium with the map data of the map region to be stored, are all stored in association with each other, the number of times map data must be written into the portable storage medium is reduced and the upper limit for the number of times the map data can be written into the portable storage medium is increased. In addition, writing the navigation identification information, coordinates of the central geographic point, and the date into the portable storage medium in association with the map data of the map region to be stored makes it possible to specify the navigation apparatus which wrote the map data into the portable storage medium, the coordinates of the central geographic point of this written map data, and the date on which the map data has been written into the portable storage medium.

The reading-writing control means may control the read-write means to read the map data from the portable storage medium only when the storage medium identification information in association therewith includes the navigation identification information stored in the navigation identification information storage means and the coordinates of the central geographic point and the date stored in the central coordinates storage means.

When provided with the reading-writing control means and the date obtaining means, the navigation apparatus reads out the storage medium identification information from the portable storage medium, and if the storage medium identification information includes the navigation identification information stored in the navigation identification information storage means, the coordinates of the central geographic point stored in the central coordinates storage means, and the date stored in association with the coordinates of the central geographic point, only then does it allow the read-write means to read the map data from the portable storage medium.

Thus, when the map data written into the portable storage medium is illegally duplicated and installed in read-write means of another navigation apparatus, the navigation identification information, the coordinates of the central geographic point, and the date associated with the illegally duplicated map data do not match the corresponding information stored in the navigation identification information storage means and in the central coordinates storage means of the other navigation apparatus and, therefore, the other navigation apparatus cannot read the map data written in the portable storage medium. Accordingly, the duplication of the map data written into the portable storage medium is further controlled and the copyright of the map data written into the portable storage medium is protected.

BRIEF DESCRIPTION OF THE DRAWINGS

Preferred embodiments of the present invention are described below with reference to the accompanying drawings, wherein.

DESCRIPTION OF PREFERRED EMBODIMENTS

Figure 1A:
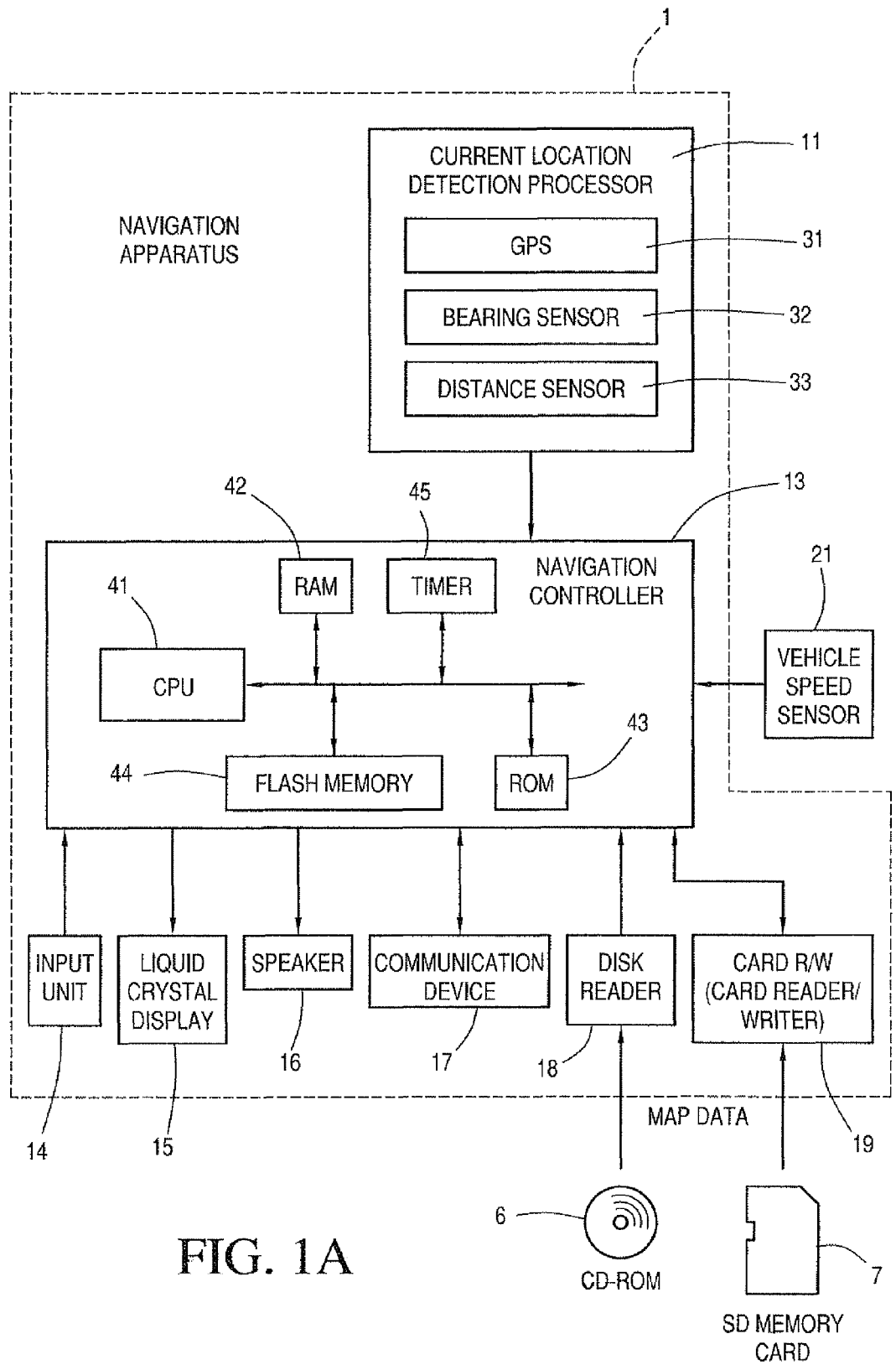
FIG. 1A is a block diagram of a preferred embodiment of a navigation apparatus according to the present invention.
Figure 1B:
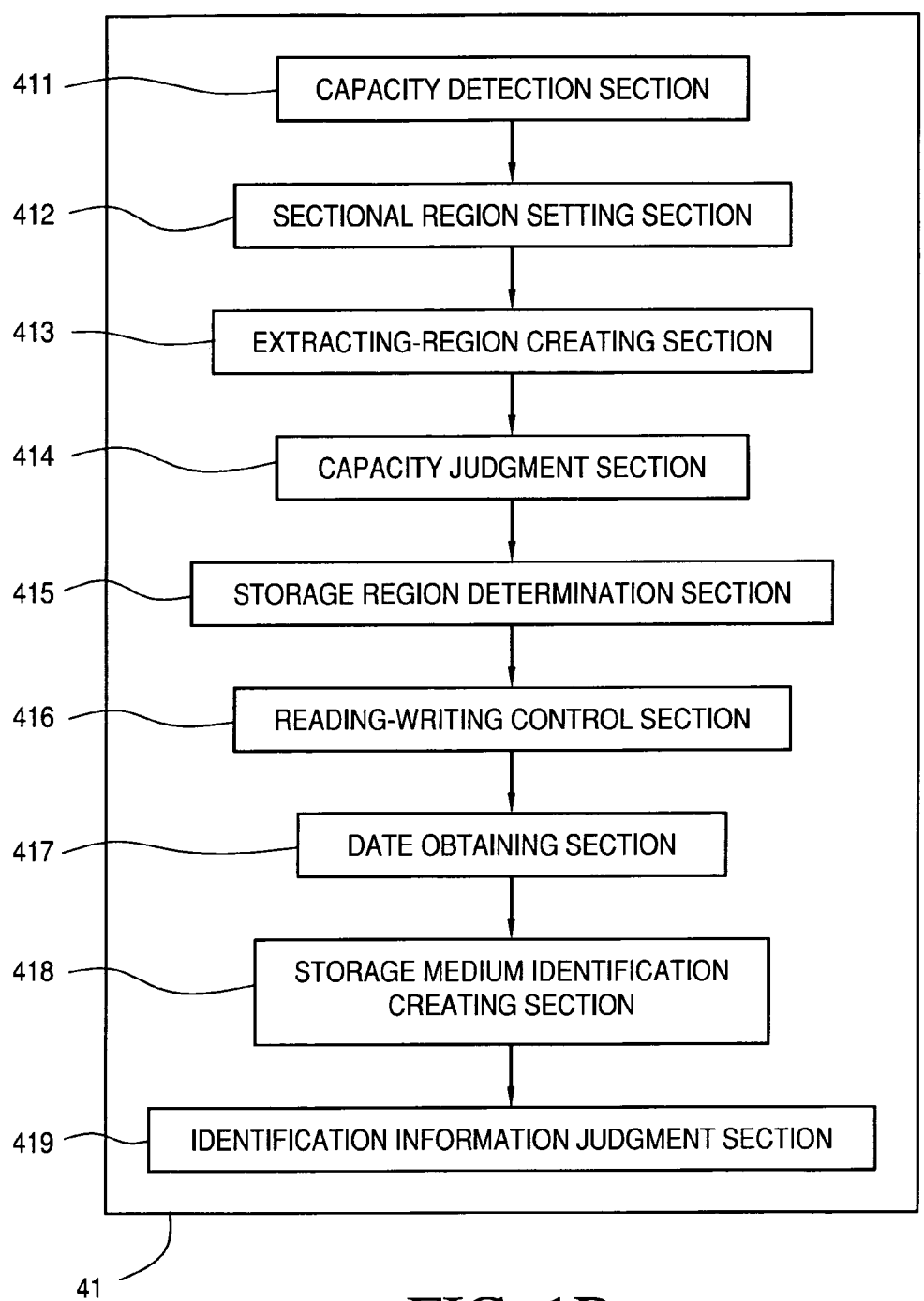
FIG. 1B is a functional block diagram of CPU 41.

FIG. 1 is a block diagram of a preferred embodiment of a navigation apparatus 1 according to the present invention. As shown in FIG. 1, the navigation apparatus 1 includes a current location detection processor 11 for detecting the current location of the driver's vehicle in which the navigation apparatus is installed, a navigation controller 13 for making various computations based on input information, an input unit 14 for accepting input from the driver or other operator, a liquid crystal display 15 for displaying information such as a map, a speaker 16 for outputting voice guidance for a route and so forth, a communication device 17 for communicating with a Vehicle Information and Communication System Center ("VICS", a registered trademark), map data delivery center (not shown in the diagrams) and/or the like via, e.g. a portable phone network, a disk reader 18 for reading a version of map data, e.g. for a prefecture(s) or state(s) from a CD-ROM 6 (an example of "map data storage means"), and a card reader/writer (a card R/W) 19 (an example of "read-write means") for writing map data into a SD memory card 7 (an example of a "portable storage medium" which has a flash memory) and also for reading map data from the SD memory card 7. In addition, a vehicle speed sensor 21 for detecting speed of the driver's vehicle is connected to the navigation controller 13.

The CD-ROM 6 stores map data which is used for travel guidance and for route searching by the navigation apparatus 1. The map data includes various items of information necessary for route guidance and for map display, for example, new road information describing each newly-built road, map display data for displaying a map, intersection data for each intersection, node data for node points, link data for road links (a road link being regarded as a "facility" herein), search data for searching for a route, data regarding POIs (Points of Interest) such as stores (another type of "facility"), search data for searching for a geographic point, and so forth.

The map display data, in particular, consists of two-dimensional units of area that are divided into quarters (half length), 16 (quarter length), or 64 (⅛ length) secondary grid units of a grid (primary grid unit) for an area approximately 10 km×10 km. Each secondary grid unit (area) is set to have about the same data volume. The smallest unit, obtained by dividing the map data area into 64 units, is approximately $1.25 km^2$ in size.

Each element of the navigation apparatus 1 will be described below. The current location detection processor 11 includes a GPS 31, a bearing sensor 32, a distance sensor 33, an altimeter (not shown in the diagrams), and so forth and is able to detect the current location and bearing of the driver's vehicle, distance to a target (an intersection, for example), and so forth.

More specifically, the GPS 31 detects the current location of the driver's vehicle and the current time by receiving radio signals from a satellite. The bearing sensor 32 may be a geomagnetic sensor, a gyro sensor, an optical rotation sensor, a potentiometer installed in or on an element rotating with the steering wheel, or an angular sensor installed adjacent a wheel, to detect the bearing of the driver's vehicle. The distance sensor 33 may be, for example, a sensor that measures rotational speed of a wheel (not shown in the diagrams) of the driver's vehicle and determines distance based on the measurement of rotational speed or a sensor that measures acceleration and determines distance by integrating the measured acceleration two times.

As shown in FIG. 1, the navigation controller 13 in the navigation apparatus 1 has internal memory devices, a CPU 41 serving as a computation device and a control device for overall control of the navigation apparatus 1, a RAM 42 serving as a working memory for the CPU 41 in making various computations and serving to store route data and so forth when a route is searched, a ROM 43 storing a control program and a program for writing, into the SD memory card 7 (as described below), map data (see FIG. 2) for a predetermined range centered on an input central geographic point and a flash memory 44 for storing a program read out from ROM 43. Further the navigation controller 13 has a timer 45 for measuring time. A semiconductor memory, a magnetic core, or the like is used as the RAM 42, the ROM 43, and the flash memory 44. A MPU or the like may be used instead of the CPU 41 as the computation device and the control device.

While the ROM 43 may store various programs, programs and/or map data can also be read out from the SD memory card 7 and written into the flash memory 44 through the card R/W 19. In addition, the programs, the map data, and so forth can be updated by exchanging a SD memory card 7 for a newer (updated) version.

Further, the navigation controller 13 is electrically connected to each of the peripheral devices (actuators) such as the input unit 14, the liquid crystal display 15, the speaker 16, the communication device 17, the disk reader 18, and the card R/W 19.

The input unit 14 is operated to change current location at the time of starting travel, to change a departure location (guidance starting point), to change a destination (guidance ending point) and to input a facility to be searched for, for example. The input unit 14 includes various keys and/or plurality of operation switches. Subsequently, the navigation controller 13 controls execution of the various corresponding operations responsive to the switch signals output by operation of the switches. Further, a touch panel is provided on the front surface of the liquid crystal display 15 and enables input of various instructions (commands) by pressing a button displayed on the screen or pressing a location on a map. Input unit 14 also enables input of a central geographic point of map data to be written into the SD memory card 7, as described hereinafter. A keyboard, a mouse, a bar-code reader, a remote controller, a joystick, a light pen, a stylus pen, and/or the like may be used as the input unit 14.

The liquid crystal display 15 shows a map of the present travel area, operational guidance, operation menus, key guidance, a guided route from the current location to a destination, guidance information for guidance in following the route, traffic information, news, weather forecasts, time, e-mails, TV programs, and so forth.

The speaker 16 outputs, for example, voice guidance for guiding travel along a guidance route, on the basis of an instruction from the navigation controller 13. The voice guidance might be, for example, "200 meters ahead, turn right at the XX intersection" or "Press the central geographic point on the map to store into the memory card".

The communication device 17 is communication means for communicating with a map data delivery center using a portable phone network or the like and transmits/receives the latest version of updated map data to/from the map data delivery center. Further, in addition to the map data delivery center, the communication device 17 receives traffic information such as traffic congestion, crowding of a rest area, and so forth, which have been sent from a Road Traffic Information Center or the like.

The disk reader 18 reads that version of map data stored in the inserted DC-ROM 6. In addition, the disk reader 18 is able to read music data, image data, map data, and so forth stored in CD, DVD, DVD-ROM, or the like. The card R/W 19 writes map data and so forth into the SD memory card 7 and reads out map data and so forth from the SD memory card 7. While the SD memory card 7 is inserted into the card R/W 19 in the present example, a miniature SD memory card, a micro SD memory card, or the like may be used instead.

Next, the writing of map data will be described with reference to FIG. 2 and FIG. 3. The process of writing map data is executed by the CPU 41 in the navigation apparatus 1 which writes map data for a predetermined range, centered on a central geographic point which has been input through the liquid crystal display 15 and/or the input unit 14, into the SD memory card 7.

Figure 2:
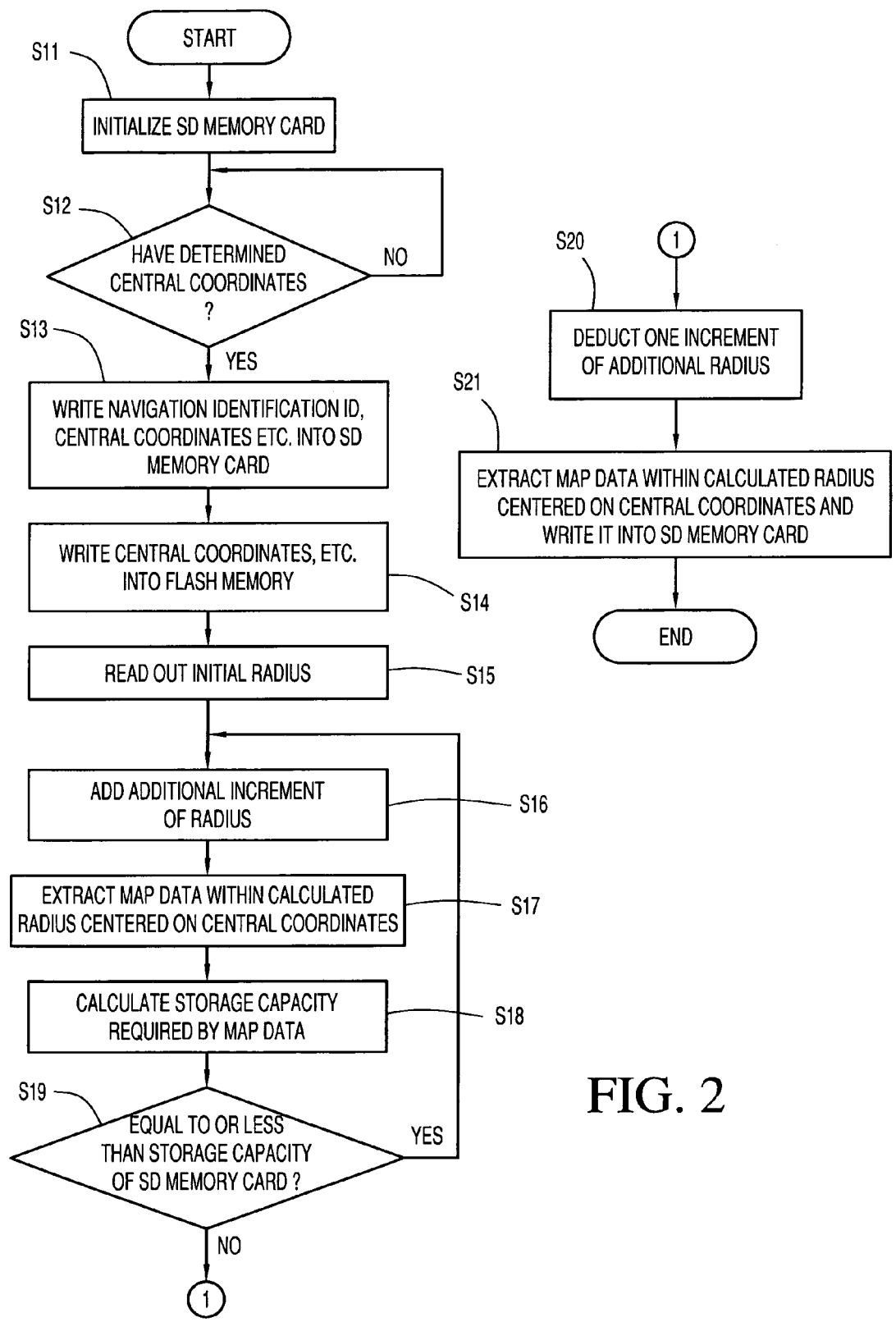
FIG. 2 is a flowchart of a program executed by the CPU of the navigation apparatus for writing, into a SD memory card, map data for a predetermined geographic range (area) centered on a central geographic point which has been input through a liquid crystal display and/or an input unit.

FIG. 2 is a flowchart illustrating a preferred method (process) executed by the CPU 41 in the navigation apparatus 1, which is the process of writing the map data, for the predetermined range centered on the central geographic point which has been input through the liquid crystal display 15 and the input unit 14, into the SD memory card. FIG. 3 is a diagram showing an exemplary maximum writable area of map region which is to be stored in the SD memory card 7. The program shown in the flowchart in FIG. 2 is stored in the ROM 43 provided in the navigation controller 13 of the navigation apparatus 1 and the program is executed by CPU 41.

As shown in FIG. 2, when an instruction is input through the input unit 14 to write the map data into the SD memory card 7, the CPU 41 first initializes the SD memory card 7 installed in the card R/W 19 in step 11 ("step" hereinafter abbreviated as "S"). In addition, the capacity detection section ("means") 411 of the CPU 41 determines the maximum storage capacity of the SD memory card 7 via the card R/W 19 and stores it in RAM 42.

Subsequently, in S12, the CPU 41 stands by for an input of coordinates of a central geographic point of the map data to be input through the input unit 14 serving as "central coordinates input means" (S12: NO). Alternatively, the "central coordinates input "means", for input of the central geographic point of the map data to be written into the SD memory card 7, can be a touch panel provided on the front surface of the liquid crystal display 15 displaying a map. For example, the central geographic point of the map data to be written into the SD memory card 7 can be input directly by inputting its coordinates (latitude and longitude, for example) by operating number keys or cursor keys of the input unit 14.

Figure 3:
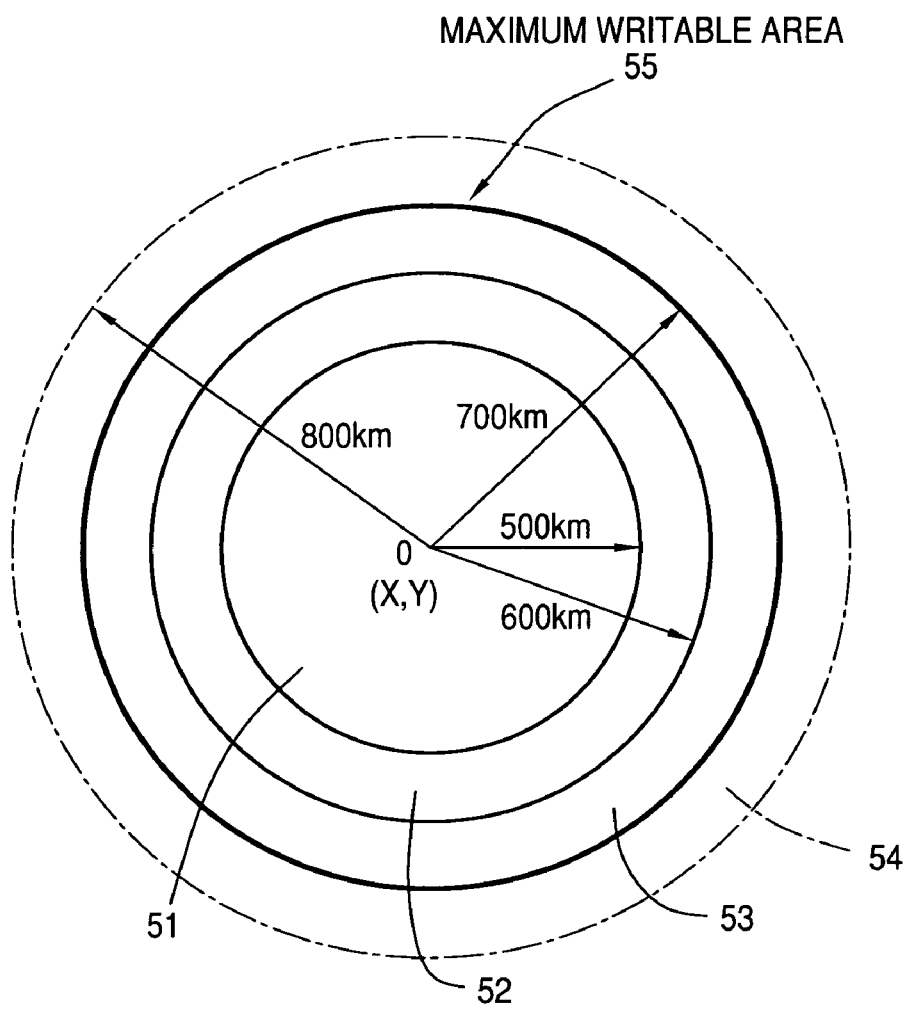
FIG. 3 is a diagram showing an example of a map region to be stored and a maximum writable area in the SD memory card.

In another example, as shown in FIG. 3, when the user presses a geographic point O on the map shown on the touch panel of the liquid crystal display 15, the CPU 41 stores the coordinates (X, Y) of the geographic point O in the RAM 42 as the coordinates of the central geographic point of the map data to be written into the SD memory card 7.

Subsequently, as shown in FIG. 2, when the coordinates of the central geographic point of the map data to be written have been input through the input unit 14 or otherwise (S12: YES), the CPU 41 then stores the coordinates of the central geographic point in RAM 42 serving as "central coordinates storage means". In addition, data obtaining section (means) 417 of the CPU 41 reads the current date from the timer 45 and stores it in the RAM 42 in association with the coordinates of the central geographic point.

Subsequently, in S13, storage medium identification information creating section (means) 418 of the CPU 41 reads out a navigation identification ID from the ROM 43, serving as "navigation identification information storage means", to distinguish between the navigation apparatus 1 and other navigation apparatus. The CPU 41 also reads out the coordinates of the central geographic point and the date associated with the coordinates of the central geographic point from the RAM 42. Then, the CPU 41 writes the navigation identification ID, the coordinates of the central geographic point, and the date into the SD memory card 7 as information for storage medium identification.

In S14, the CPU 41 again reads out the coordinates of the central geographic point and the date associated with the coordinates of the central geographic point from the RAM 42. Then, the CPU 41 stores the coordinates of the central geographic point in the flash memory 44 and at the same time stores the date in the flash memory 44 in association with the coordinates of the central geographic point.

In S15, the sectional region setting means 412 of the CPU 41 reads out from the ROM 43 an initial radius (approximate 500 kilometers, for example) of a central sectional region centered on the central geographic point. In addition, in S16, the CPU 41 reads out from the ROM 43 a first additional radius (approximate 100 kilometers, for example) defining a predetermined distance range for an outer sectional region surrounding the central sectional region. Then, the CPU 41 adds the additional radius to the initial radius and stores it in the RAM 42 as a calculated radius, thereby setting a central sectional region and an outer sectional surrounding the central sectional region.

Subsequently, in S17, the CPU 41 reads out the coordinates of the central geographic point and the calculated radius from the RAM 42 and an extracting-region creating section ("means") 413 of the CPU 41 sets the area within the calculated radius centered on the central geographic point as a map data extracting-region. Then, the extracting-region creating section ("means") 413 of the CPU 41 reads out map data of each of secondary grid units in the map data extracting-region, sequentially, from the CD-ROM 6 through the disk reader 18 and stores it in the RAM 42.

For example, as shown in FIG. 3, when the CPU 41 has read out from the ROM 43 the initial radius 500 kilometers for the central sectional region 51 centered on the central geographic point O and the additional radius of 100 kilometers for the outer sectional region 52, concentric with and radially outward of the central sectional region 51, a range (area) with a radius of 600 kilometers is set by adding 100 kilometers to the initial 500 kilometer radius by the extracting-region creating section ("means") 413 of the CPU 41 as the map data extracting-region. In other words, the range obtained by adding the outer sectional region 52 to the central sectional region 51 is set as the map data extracting-region, and the map data of each of the secondary grid units in the map data extracting-region is read out, sequentially, from the CD-ROM 6 by the extracting-region creating section ("means") 413 of the CPU 41 through the disk reader 18 and stored in the RAM 42.

As shown in FIG. 2, in S18, a capacity judgment section ("means") 414 of the CPU 41 calculates the storage capacity required for the map data in the map data extracting-region stored in the RAM 42 and stores it in RAM 42. Then, in S19, the capacity judgment section ("means") 414 of the CPU 41 reads out the storage capacity required for the map data in the map data extracting-region and the maximum storage capacity of the SD memory card 7 from the RAM 12, and then executes a judgment of whether or not the storage capacity required by the map data in the map data extracting-region is equal to or less than the maximum storage capacity of the SD memory card 7.

In the case where the storage capacity required for the map data in the map data extracting-region is equal to or less than the maximum storage capacity of the SD memory card 7 (S19: YES), the CPU 41 proceeds to S16. In Step S16, the additional radius (approximate 100 meters, for example) is read out from the ROM 43, and the additional radius is added to the previously calculated radius and stored into the RAM 42 as a new calculated radius. Then step S17 and the subsequent steps are executed.

For example, as shown in FIG. 3, when the range obtained by adding the outer sectional region 52 to the central sectional region 51 is set as the map data extracting-region and the storage capacity required for the map data in the map data extracting-region is equal to or less than the maximum storage capacity of the SD memory card 7 (S19: YES), extracting-region creating section 413 of the CPU 41 sets a new range, with a radius of 700 kilometers, which is obtained by once again adding the additional radius of 100 kilometers to the calculated radius of 600 kilometers as the map data extracting-region. The radius of 700 kilometers of the map data extracting-region is then stored in the RAM 42 as a new calculated radius. Then step S17 and subsequent steps are again executed.

On the other hand, when the storage capacity required by the map data in the map data extracting-region has exceeded the maximum storage capacity of the SD memory card 7 (S19: NO), the CPU 41 proceeds to step S20. In S20 a storage region determination section ("means") 415 of, the CPU 41 reads out the calculated radius from the RAM 42 and at the same time reads out the additional radius (approximately 100 kilometers, for example) from the ROM 43, deducts the additional radius from the calculated radius, and stores it in the RAM 42 as a calculated radius for the "map region to be stored", that is, the maximum writable area for the map data in the SD memory card 7.

Subsequently, in S21, the CPU 41 reads out the coordinates of the central geographic point and the calculated radius of the map region to be stored from the RAM 42 and sets the area of the calculated radius centered on the central geographic point as the map region to be stored. Then, the reading-writing control section ("means") 416 of CPU 41 reads (extracts) the map data of each secondary grid unit in the map region to be stored, sequentially from the CD-ROM 6 through the disk reader 18, and sequentially writes the extracted map data into the SD memory card 7, and then the processing is terminated.

As shown in FIG. 3, for example, the total range of the outer regions 52, 53, and 54 and the central sectional region 51 is set as the map data extracting-region, i.e. a range of a calculated radius 800 kilometers centered on the central geographic point O is set as the map data extracting-region. Subsequently, if the storage capacity of the map data in the map data extracting-region has exceeded the maximum storage capacity of the SD memory card 7 (S19: NO), the CPU 41 sets the range of the calculated radius to 700 kilometers by deducting 100 kilometers from the previously calculated radius of 800 kilometers, thus limiting the range for the composite of the outer sections 52 and 53 and the central sectional region 51 to a map region to be stored 55 which does not exceed the maximum writable area for the map data in the SD memory card 7. Then the map data of each secondary grid unit in the map region to be stored 55 is sequentially read out from the CD-ROM 6 through the disk reader 18 and sequentially written into the SD memory card 7, and then the process is terminated. (S20 to S21)

Figure 4:
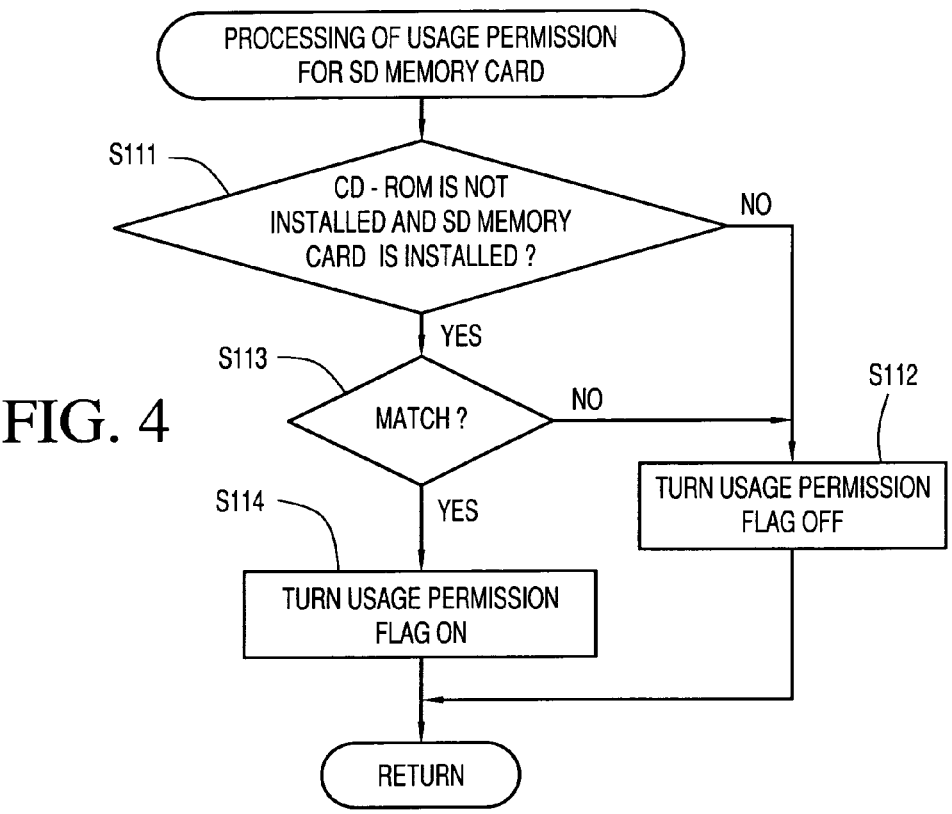
FIG. 4 is a flowchart of a sub-routine executed by the CPU for judging usage permission for the SD memory card installed in a card R/W.

FIG. 4. FIG. 4 is a flowchart illustrating a sub-routine for determining a usage permission for the SD memory card 7 installed in the card R/W 19. Note that the sub-routine shown in FIG. 4 is executed by the CPU 41 at regular time intervals (every 10 m sec. to 100 m sec., for example) and is stored in the ROM 43 provided in the navigation controller 13 of the navigation apparatus 1.

As shown in FIG. 4, in S111, the CPU 41 judges whether or not the CD-ROM 6 is installed in the disk reader 18 and the SD memory card 7 is installed in the card R/W 19. When the CD-ROM 6 is installed in the disk reader 18 or neither the CD-ROM 6 nor SD memory card 7 is installed (S111: No), the CPU 41 proceeds to step of S112. In step S112, the CPU 41 reads out from the RAM 42 a usage permission flag for permitting use of the SD memory card 7, sets the usage permission flag to OFF, stores it back into the RAM 42, terminates the sub-routine and returns to the main program. Note that, at the time of start-up or reset of the navigation apparatus 1, the usage permission flag is set OFF and stored in the RAM 42.

On the other hand, when the CD-ROM 6 is not installed in the disk reader 18 and the SD memory card 7 is installed in the card R/W 19 (S111: YES), the CPU 41 proceeds to step of S113. In step S113, the CPU 41 reads out from the SD memory card 7 through the card R/W 19 the navigation identification ID, the coordinates of the central geographic point, and the date as storage medium identification information. Then, the identification judgment section (means) 419 of the CPU 41 executes a judgment as to whether or not the navigation identification ID which has been read out from the SD memory card 7 matches the navigation identification ID stored in the ROM 43 (serving as a "navigation identification information storage means") and a judgment as to whether or not the coordinates of the central geographic point and the date which have been read out from the SD memory card 7 match the coordinates of the central geographic point stored in the flash memory 44 (serving as a "central coordinates storage means") and the date stored in the flash memory 44 in association with the coordinates of the central geographic point.

Subsequently, when any one of (1) the navigation identification ID, (2) the coordinates of the central geographic point, and (3) the date, which have been read out from the SD memory card 7, does not match the navigation identification ID stored in the ROM 43, the coordinates of the central geographic point and the date thereof stored in the flash memory 44 (S113: NO), the CPU 41 proceeds to step of S112. In step S112, the CPU 41 reads out the usage permission flag for permitting use of the SD memory card 7 from the RAM 42, sets the usage permission flag OFF, stores it back into the RAM 42, terminates the sub-routine and returns to the main program.

On the other hand, when the navigation identification ID which has been read out from the SD memory card 7 matches the navigation identification ID stored in the ROM 43 and also the coordinates of the central geographic point and the date which have been read out from the SD memory card 7 match the coordinates of the central geographic point and date thereof stored in the flash memory 44 (S113: YES), the CPU 41 proceeds to step S114.

In step S114, the CPU 41 reads out the usage permission flag for permitting use of the SD memory card 7 from the RAM 42, sets the usage permission flag ON, stores it back into the RAM 42, terminates the sub-routine and returns to the main program. Accordingly, when the CD-ROM 6 is not installed in the disk reader 18 and the SD memory card 7 is installed in the card R/W 19, only when the navigation identification ID which has been read out from the SD memory card 7 matches the navigation identification ID stored in the ROM 43 and the coordinates of the central geographic point and the date which have been read out from this SD memory card 7 match the coordinates of the central geographic point and the date thereof stored in the flash memory 44, the usage permission flag, permitting use of the SD memory card 7, is set ON, that is, the SD memory card 7 is permitted to be used in the apparatus (S111 to S114).

Figure 5:
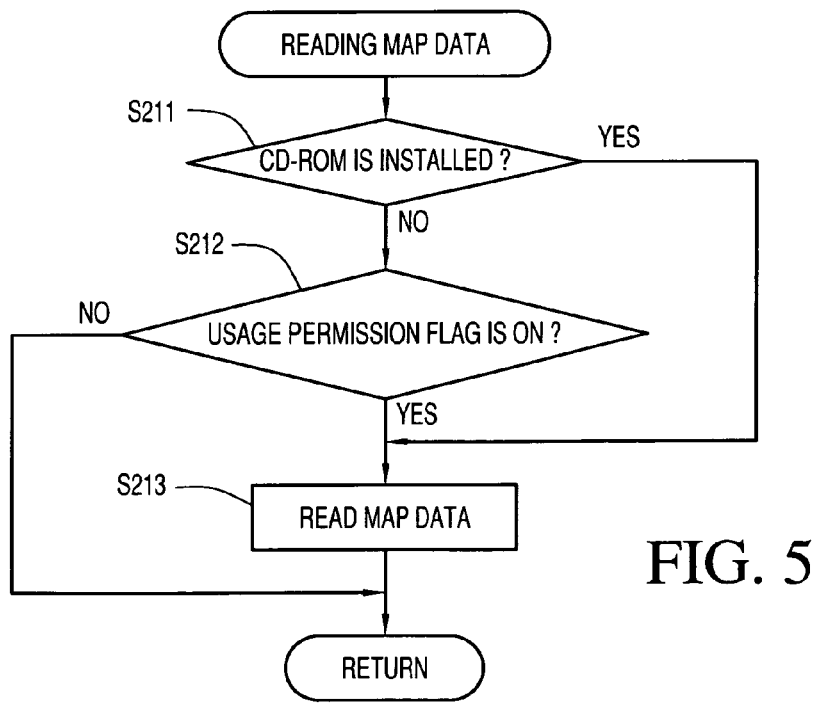
FIG. 5 is a flowchart of a sub-routine for reading map data which is executed by the CPU to read the map data from a CD-ROM or the SD memory card.

Next, a map data reading sub-routine executed by the CPU 41 for reading map data from the CD-ROM 6 or the SD memory card 7 will be described with reference to FIG. 5. FIG. 5 is a flowchart illustrating the sub-routine executed by the CPU 41 for reading map data from the CD-ROM 6 or the SD memory card 7. The sub-routine shown in FIG. 5 is executed by the CPU 41 at regular time intervals (every 10 m sec. to 100 m sec., for example) and is stored in the ROM 43 included in the navigation controller 13 of the navigation apparatus 1.

As shown in FIG. 5, in S211, the CPU 41 judges whether or not the CD-ROM 6 has been installed in the disk reader 18. When the CD-ROM 6 has been installed in the disk reader 18 (S211: YES), the CPU 41 proceeds to step S213. In step S213, the CPU 41 reads the map data from the CD-ROM 6 through the disk reader 18, stores it in the RAM 42, terminates the sub-routine and returns to the main program. Thereby, the map data can be set to be read from the CD-ROM 6 by giving priority to the CD-ROM 6 over the SD memory card 7.

On the other hand, when no CD-ROM is installed in the disk reader 18 (S211: NO), the CPU 41 proceeds to step S212. In S212, the CPU 41 reads out the usage permission flag from the RAM 42 and executes a judgment as to whether or not the usage permission flag is set ON, that is, whether or not use of the SD memory card 7 is permitted. When the usage permission flag read out from the RAM 42 is set OFF (S212: NO), the CPU 41 terminates the sub-routine and returns to the main program.

When the usage permission flag read out from the RAM 42 is set ON (S212: YES), the CPU 41 proceeds to step S213. In S213, the CPU 41 reads out the map data from the SD memory card 7 through the card R/W 19, stores it in the RAM 42, terminates the sub-routine and returns to the main program. Therefore, when no CD-ROM is installed in the disk reader 18, the CPU 41 can execute a route search and rouge guidance on the basis of the map data read out from the SD memory card 7. In addition, by removing the CD-ROM 6 from the disk reader 18 and installing the SD memory card 7 in the card R/W 19, a user can install a CD or a DVD in the disk reader 18 to play music or a movie.

Accordingly, in the present embodiment, when instruction for writing the map data into the SD memory card 7 (including a flash memory) has been input through the input unit 14, the SD memory card 7 installed in the card R/W 19 is initialized and it's maximum storage capacity is determined and stored in the RAM 42 (S11). When the coordinates of the central geographic point of the map data to be written has been input through the input unit 14 and so forth, the storage medium identification information creating section 418 of the CPU 41 writes the navigation identification ID, the coordinates of the central geographic point, and the date, as the storage medium identification information, into the SD memory card 7 and at the same time stores the coordinates of the central geographic point and the date in the flash memory 44 (S12 to S14). Thereafter, the CPU 41 reads out the initial radius and the additional (increment of) radius from the ROM 43, calculates a radius by sequentially adding the additional radius to the initial radius, sets the area within the calculated radius centered on the coordinates of the central geographic point as the map data extracting-region, sequentially reads out the map data of each of the secondary grid units in this map data extracting-region from the CD-ROM 6, through the disk reader 18, and stores it in the RAM 42. Then, when the volume of the map data in the map data extracting-region exceeds the maximum storage capacity of the SD memory card 7, the CPU 41 deducts one increment of the "additional radius" from the calculated radius and stores it in the RAM 42 as the calculated radius of the map region to be stored, that is, the maximum writable area of map data in the SD memory card 7. Then, the area within the calculated radius centered on the coordinates of the central geographic point is set as the map region to be stored. The map data of each of the secondary grid units in the map region to be stored is sequentially read out from the CD-ROM 6 through the disk reader 18 and sequentially written into the SD memory card 7 (S15 to S21).

Thereby, simply by inputting the coordinates of the central geographic point of the map data through the input unit 14, the map data of the central sectional region centered on the central geographic point and the map data of an outer sectional region of maximum range, which does not exceed the maximum storage capacity of the SD memory card 7, can be extracted and automatically written into the SD memory card 7. Thus, the map data for an entire outer sectional area of the range of the map data is not deleted when written into the SD memory card 7. Further, there is no reduction in the upper limit of the number of times map data may be written into the SD memory card 7.

In addition, when the coordinates of the central geographic point of the map data to be written are input through the input unit 14, storage medium identification information creating section 418 of the CPU 41 writes the navigation identification ID, the coordinates of the central geographic point, and the date, as the storage medium identification information, into the SD memory card 7 and at the same time stores the coordinates of the central geographic point and the date in the flash memory 44 (S12 to S14).

Only when the navigation identification ID which has been read out from the SD memory card 7 matches the navigation identification ID stored in the ROM 43 ("navigation identification information storage means") and when the coordinates of the central geographic point and the date which have been read out from the SD memory card 7 match the coordinates of the central geographic point and date thereof stored in the flash memory 44 ("central coordinates storage means") in association with the coordinates of the central geographic point, is the usage permission flag is set ON (S113: YES to S114). Further, only when the usage permission flag is set ON, can the CPU 41 read the map data from the SD memory card 7 (S212: YES to S213).

If the map data written in the SD memory card 7 has been illegally duplicated and installed in a card R/W 19 of another navigation apparatus, the navigation identification information, the coordinates of the central geographic point, and the date associated with the map data which has been illegally duplicated are not stored in the ROM 43 and the flash memory 44 of the other navigation apparatus and, therefore, the other navigation apparatus cannot read the map data written in the SD memory card 7. Accordingly, it is possible to prevent the duplication of the map data written in the SD memory card 7 and to protect the copyright of the map data written in the SD memory card 7.

Note that the present invention is not limited to the details of the embodiment described above. Various alternatives, modifications, variations, and/or improvements of the above embodiment are possible. Various changes may be made without departing from the broad spirit and scope of the underlying principles. For example, the above embodiment may be modified as below.

The central sectional region including the central geographic point is not necessary a circle but may be a rectangle, an ellipse, etc.

In step 13 (FIG. 2), the CPU 41 may write the navigation identification ID and the coordinates of the central geographic point as storage medium identification information into the SD memory card 7, and in step 14 store the coordinates of the central geographic point into the flash memory 44.

In addition, in step 13, the storage medium identification information creating section 418 of the CPU 41 may write the data in which not only the navigation identification ID, the coordinates of the central geographic point, and the date, but also a vehicle position, current time, location of home, and so forth into the SD memory card 7 as storage medium identification information. Then, in step 14, not only the coordinates of the central geographic point and the date but also the vehicle position, the current time, and the location of home are stored in the flash memory 44.

Further, in the above step 14, the CPU 41 may store all the storage medium identification information which has been written into the SD memory card 7 into the flash memory 44 as well. Accordingly, the navigation identification ID may also be stored in the flash memory 44 together with the coordinates of the central geographic point.

In step 11, when the instruction for writing the map data into the SD memory card 7 has been input through the input unit 14, the CPU 41 may read out from the SD memory card 7 the number of times map data has been written into that SD memory card 7 installed in the card R/W 19 ("map data entry number") and at the same time may read out a counter number of the map data entries from the RAM 42. Then, the CPU 41 may assign the number read from the SD memory card 7 and store that number in the RAM 42 again, and then initialize the SD memory card 7. In addition, the capacity detection section 411 of the CPU 41 may determine the maximum storage capacity of the SD memory card 7 through the card R/W 19 and store it in the RAM 42.

Note that number which indicates the number of times map data has been written into the SD memory card 7 may be stored in the SD memory card 7 as described below. When no number for the times map data has been written is stored in the SD memory card 7, the CPU 41 may determine that the current writing of map data into the SD memory card 7 is the first such writing, then read the counter number from the RAM 42, assign "1" to that counter number, store it back into the RAM 42, and initialize the SD memory card 7. At the time of start-up or reset of the navigation apparatus 1, "0" may be assigned to the counter number and stored in the RAM 42.

Then, when the coordinates of the central geographic point of the area of map data to be written has been input through the input unit 14 (S12: YES), the CPU 41 may store the coordinates of the central geographic point in the RAM 42. In addition, the CPU 41 may read out the counter number from the RAM 42, may add "1" to the counter number, and may store the new counter number in the RAM 42 as a map data entry number corresponding to the coordinates of the central geographic point.

Subsequently, in S13, the storage medium identification creation section 418 of the CPU 41 may read out from the ROM 43 the navigation identification ID to distinguish the navigation apparatus 1 from other navigation apparatuses. The CPU 41 may also read out from the RAM 42 the coordinates of the central geographic point and the map data entry number corresponding to the coordinates of the central geographic point. Then the CPU 41 may write into the SD memory card 7 the navigation identification ID, the coordinates of the central geographic point, and the map data entry number as the storage medium identification information. The CPU 41 thereby knows the number of times the map data has been written into the SD memory card 7 by reading out the map data entry number from the SD memory card 7.

In S14, the CPU 41 may again read out from the RAM 42 the coordinates of the central geographic point and the data entry number corresponding to the coordinates of the central geographic point again. Then, the CPU 41 may store the coordinates of the central geographic point in the flash memory 44 and at the same time may store the data entry number associated with the coordinates of the central geographic point in the flash memory 44.

In the above step S113, the CPU 41 may read out from the SD memory card 7 the navigation identification ID, the coordinates of the central geographic point, and the data entry number as the storage medium identification information, through the card R/W 19, and the identification judgment section 419 may judge whether or not the navigation identification ID which has been read out from this SD memory card 7 matches the navigation identification ID stored in the ROM 43 and also whether or not the coordinates of the central geographic point and the data entry number which have been read out from the SD memory card 7 match the coordinates of the central geographic point stored in the flash memory 44 and the data entry number stored in the flash memory 44 in association with the coordinates of the central geographic point.

If any one of the navigation identification ID, the coordinates of the central geographic point, and the data entry number which have been read out from the SD memory card 7 does not match the navigation identification ID stored in the ROM 43, the coordinates of the central geographic point stored in the flash memory 44, and the data entry number stored in the flash memory 44 in association with the coordinates of the central geographic point (S113: NO), execution of the sub-routine proceeds to step S112.

On the other hand, when the navigation identification ID which has been read out from the SD memory card 7 matches the navigation identification ID stored in the ROM 43 and also the coordinates of the central geographic point and the data entry number which have been read out from the SD memory card 7 match the coordinates of the central geographic point and the data entry number stored in the flash memory 44 (S113: YES), execution of the sub-routine proceeds to step S114.

In step 16 described above, the additional radius increment that is added to obtain the calculated radius, after the first such addition (or later), may be set to a longer additional distance (radius) in a predetermined ratio (approx. 10% to 20%, for example) to the additional increment of radius previously added to the total calculated radius. Thereby, the range of each outer sectional region sequentially becomes wider. In this manner, the number of repetitions of steps S16 to S19 may be decreased and the time required for writing the map data into the SD memory card 7 becomes shorter.

Conversely, in step 16, the additional radius that is to be added to the previously calculated radius after the first such addition (or later) may be set to a shorter additional radius increment in a predetermined ratio (approx. 10% to 20%, for example) to the previously added increment of radius to obtain a new calculated radius. Thereby, the range of each outer sectional region sequentially becomes smaller and, therefore, the SD memory card 7 may store as much map data as possible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation apparatus comprising:
   map data storage means for storing map data;
   read-write means for writing the map data into a portable storage medium and for reading out the map data from the portable storage medium;
   capacity detection means for detecting maximum storage capacity of the portable storage medium;
   central coordinates input means for inputting coordinates of a central geographic point of the map data to be written into the portable storage medium;
   sectional region setting means for setting a central sectional region with a predetermined range including the central geographic point and an outer sectional region of an additional predetermined range surrounding the central sectional region;
   extracting-region creating means for sequentially creating map data extracting-regions by repeatedly adding an additional predetermined range to the central sectional region;
   capacity judgment means for sequentially extracting map data, of each map data extracting-region created by the extracting-region creating means, from the map data storage means and for sequentially judging whether or not the volume of map data of each map data extracting-region is equal to or less than the detected maximum storage capacity;

storage region determination means for determining the largest map data extracting-region which does not exceed the detected maximum storage capacity; and reading-writing control means for extracting map data, for the largest map data extracting region determined by the storage region determination means, from the map data storage means and for controlling the read-write means to write the extracted map data into the portable storage medium.

2. The navigation apparatus according to claim 1, further comprising:

navigation identification information storage means for storing navigation identification information which identifies the navigation apparatus;

central coordinates storage means for storing the coordinates of the central geographic point; and storage medium identification information creating means for creating storage medium identification information including the navigation identification information and the coordinates of the central geographic point, wherein:

the reading-writing control means controls the read-write means to write into the portable storage medium the map data of the map region determined to be stored in association with the storage medium identification information.

3. The navigation apparatus according to claim 2, further comprising:

identification information judgment means for determining whether or not the storage medium identification information from the portable storage medium matches the navigation identification information stored in the navigation identification information storage means and the coordinates of the central geographic point stored in the central coordinates storage means; and wherein the reading-writing control means allows the read-write means to read the map data from the portable storage medium only when a match is determined.

4. The navigation apparatus according to claim 3, further comprising:

date obtaining means for obtaining a date on which the map data is written into the portable storage medium, wherein:

the central coordinates storage means stores the date in correlation with the coordinates of the central geographic point and the storage medium identification information includes the date.

5. The navigation apparatus according to claim 4 wherein the reading-writing control means controls the read-write means to read the map data from the portable storage medium only when the storage medium identification information includes the navigation identification information stored in the navigation identification information storage means and the coordinates of the central geographic point and the date stored in the central coordinates storage means.

6. The navigation apparatus according to claim 2, further comprising:

date obtaining means for obtaining a date on which the map data is written into the portable storage medium, wherein:

the central coordinates storage means stores the date in correlation with the coordinates of the central geographic point and the storage medium identification information includes the date.

7. The navigation apparatus according to claim 6 wherein the reading-writing control means controls the read-write means to read the map data from the portable storage medium only when the storage medium identification information includes the navigation identification information stored in the navigation identification information storage means and the coordinates of the central geographic point and the date stored in the central coordinates storage means.

8. A navigation method comprising:

storing map data in a map storage unit of a computer;

detecting maximum storage capacity of a portable storage medium;

inputting into the computer coordinates of a central geographic point of the map data to be written into the portable storage medium;

setting a central sectional region with a predetermined range including the central geographic point and sequentially adding outer sectional regions surrounding the central sectional region, each outer sectional region having a range of a predetermined distance greater than the range of the central sectional region, thus creating a new map data extracting-region with each addition of an outer sectional region;

sequentially extracting map data for each created map data extracting-region from the map data storage unit and, for each extraction of map data, judging whether or not the total amount of extracted map data is equal to or less than the maximum storage capacity;

determining the largest map data extracting-region which does not exceed the maximum storage capacity, as a map region to be stored, when the map data extracting-region has exceeded the maximum storage capacity; and extracting the map data of the map region to be stored from the map data storage means and writing into the portable storage medium the map data extracted for the map region to be stored.

9. The navigation method according to claim 8, further comprising:

storing navigation identification information which identifies the navigation apparatus;

storing the coordinates of the central geographic point; and creating storage medium identification information including the navigation identification information and the coordinates of the central geographic point, wherein:

only the map data of the map region to be stored which is associated with the storage medium identification information is written into the portable storage medium.

10. The navigation method according to claim 9, comprising:

reading out the storage medium identification information from the portable storage medium and determining whether or not the storage medium identification matches the previously stored navigation identification information and coordinates of the central geographic point; and allowing map data to be read from the portable storage medium only when a match is determined.

11. The navigation method according to claim 10, further comprising:

obtaining the date on which the map data is written into the portable storage medium, and:

storing the date in association with the coordinates of the central geographic point to include the date in the storage medium identification information.

12. The navigation method according to claim 11 wherein the map data is allowed to be read from the portable storage medium only when storage medium identification information in the portable storage medium includes the previously stored navigation identification information, the coordinates of the central geographic point and the associated date.

13. The navigation method according to claim 9, further comprising:
    obtaining the date on which the map data is written into the portable storage medium; and
    storing the date in association with the coordinates of the central geographic point to create storage medium identification information including the date.

14. The navigation method according to claim 13 wherein the map data is allowed to be read from the portable storage medium only when storage medium identification information in the portable storage medium includes the previously stored navigation identification information, the coordinates of the central geographic point and the associated date.

* * * * *